United States Patent [19]

Lindsley

[11] Patent Number: 5,222,036
[45] Date of Patent: Jun. 22, 1993

[54] DEVICE AND METHOD FOR EVALUATING TRIGONOMETRIC FUNCTIONS

[75] Inventor: Brett L. Lindsley, Highwood, Ill.
[73] Assignee: Motorola, Inc., Schaumburg, Ill.
[21] Appl. No.: 555,337
[22] Filed: Jul. 19, 1990
[51] Int. Cl.[5] .............................................. G06F 7/548
[52] U.S. Cl. .................................................... 364/729
[58] Field of Search ............... 364/729, 725, 726, 733, 364/752

[56] References Cited

U.S. PATENT DOCUMENTS

| | | | |
|---|---|---|---|
| 3,735,110 | 5/1973 | LeComte | 364/729 |
| 4,809,205 | 2/1989 | Freeman | 364/729 X |
| 4,951,238 | 8/1990 | Sasahara | 364/729 |
| 4,956,799 | 9/1990 | Nakayama | 364/729 |

*Primary Examiner*—Jerry Smith
*Attorney, Agent, or Firm*—Darleen J. Stockley

[57] ABSTRACT

A method and device are provided for processing an input value to provide an output trigonometric function value of the input value. It comprises a method and device for modifying the input value to obtain an approximation value, determining an error value with respect to the approximation value, generating first and second function values with respect to the approximation value, the first and second function values typically being trigonometric function values and typically being obtained from a memory device, determining at least one correction value utilizing a predetermined number of terms of at least one power series, and combining the at least one correction value with the first and second function values to determine the output trigonometric function value.

87 Claims, 4 Drawing Sheets

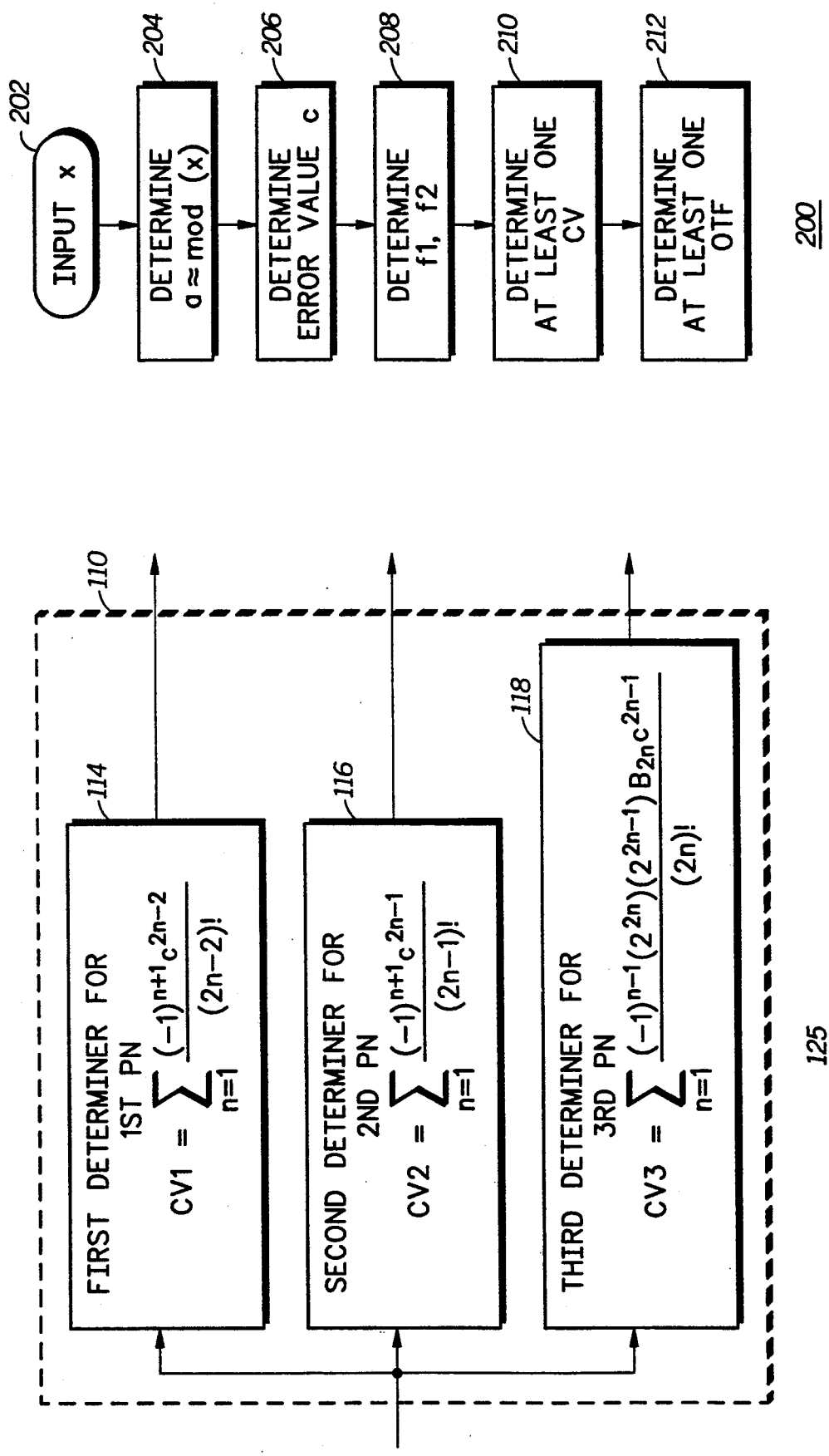

DEVICE AND METHOD FOR EVALUATING TRIGONOMETRIC FUNCTIONS

FIELD OF THE INVENTION

This invention is concerned with transcendental function evaluation (TFE). More particularly, this invention is concerned with a method and device for digital signal processing evaluation of trigonometric functions.

BACKGROUND OF THE INVENTION

Volder first proposed a CORDIC algorithm to utilize hardware implementation for evaluating trigonometric functions in fixed point arithmetic. The CORDIC computing technique typically utilizes a special arithmetic unit for implementing a prescribed sequence of conditional additions or subtractions for evaluating trigonometric functions.

Walther, in *A Unified Algorithm for Elementary Functions*, Spring Joint Computer Conference, 1971 describes a generalization of the CORDIC algorithm typically for fixed point arithmetic implementation, and typically implemented in hardware due to dilatory execution when implemented in software.

Utilization of the CORDIC algorithm generally may not be feasible in some hardware systems, and software implementation of the CORDIC algorithm generally provides slow evaluation of trigonometric functions. Thus, an efficient floating point trigonometric function evaluator is needed.

SUMMARY OF THE INVENTION

A method and apparatus are provided for substantially processing an input value to provide at least one output trigonometric function value of the input value. A modifier utilizes the input value to generate an approximation value. A first memory device (a first ROM) and a function generator determine a first function value and a second function value, typically a sine function value and a cosine function value, respectively, typically utilizing the first ROM and a second memory device. Clearly, the first ROM and the second memory device may be portions of one memory device, typically a ROM, or may be separate memory devices.

An error generator generates an error value, typically a first difference value of the input value minus the approximation value. A correction evaluator substantially utilizes the error value to determine at least one correction value, typically utilizing at least one predetermined number of at least one predetermined mathematical series. Generally, at least one selected power series is utilized as the at least one predetermined mathematical series.

A combiner utilizes at least one correction value, the first function value, and the second function value to determine at least one output trigonometric function value of the input value. Typically, the combiner determines at least one of: a sine function value, a cosine function value, and a tangent function value, respectively, the reciprocals of those values clearly being readily determined also.

BRIEF DESCRIPTION OF THE DRAWINGS

FIG. 1B sets forth one embodiment of a correction evaluator.

FIG. 2A is a general flow chart of an implementation of the method of the invention.

BEST MODE FOR CARRYING OUT THE INVENTION

Figure 1A:
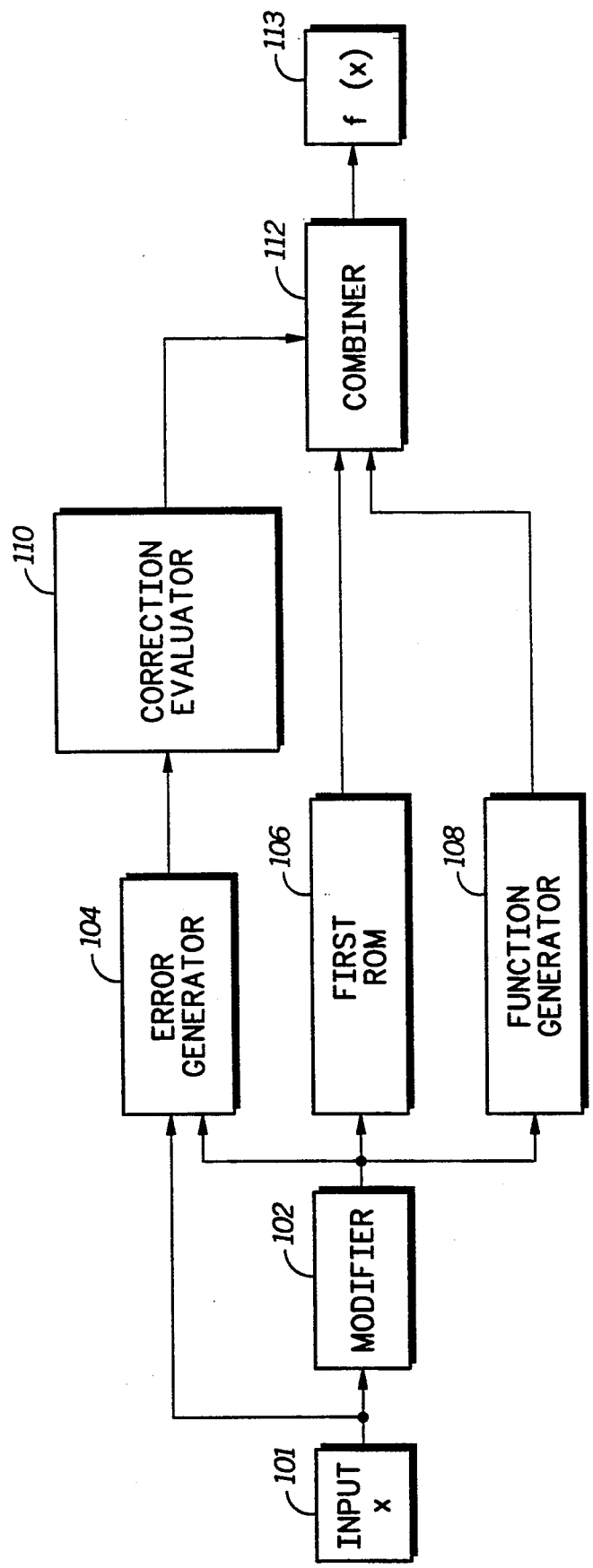
FIG. 1A is a block diagram of a computer hardware implementation of the invention.

FIG. 1A, generally depicted by the numeral 100, sets forth one embodiment of a computer hardware implementation of the invention. A modifier (102) utilizes an input value $X$ (101) to determine an approximation value, the approximation value being selected from a predetermined set of values. The predetermined set of values typically is a group of approximation values determined by selected rounding algorithms, thereby providing the approximation value as a value having a number of bits less than or equal to a number of bits of precision of the input value.

A first memory device (a first ROM) (106) determines a first function value, typically a sine function value of the approximation value. A function generator (108) determines a second function value, typically a cosine function value of the approximation value, and generally determined by utilizing a memory device as described above. It is clear that the first memory device and the function generator may be reversed, and subsequent output utilizations modified pursuant to that reversal. It is also clear that one or more memory devices may be utilized in the first and second function value determinations.

An error generator (104) utilizes the input value and the approximation value to substantially obtain an error value, c, typically a first difference of the input value minus the approximation value.

The correction evaluator (110), one embodiment of which is set forth in FIG. 1B, numeral 125, substantially obtains at least one correction value. The correction evaluator (110) utilizes at least one of:

a first determiner (114) for utilizing c together with a first predetermined number (1st PN) of terms of a first predetermined mathematical series (FPS), substantially a first power series $$\sum_{n=1}^{\infty} \frac{(-1)^{n+1} c^{2n-2}}{(2n-2)!},$$

where $n = 1,2,3,4,\ldots$ and $c$ = the error value, to substantially evaluate the 1st PN of terms of the FPS and to substantially sum the evaluated 1st PN of terms obtained thereby, the first sum being substantially a first correction value (CV1);

a second determiner (116) for utilizing c together with a second predetermined number (2nd PN) of terms of a second predetermined mathematical series (SPS), substantially a second power series $$\sum_{n=1}^{\infty} \frac{(-1)^{n+1} c^{2n-1}}{(2n-1)!},$$

where $n = 1,2,3,4,\ldots$ and $c$ = the error value, to substantially evaluate the 2nd PN of terms of the SPS, and to substantially sum the evaluated 2nd PN of terms obtained thereby, obtaining substantially a second sum, the second sum being substantially a second correction value (CV2); and a third determiner (118) for utilizing c together with a third predetermined number (3rd PN) of terms of a third predetermined mathematical series (TPS), substantially a third power series, $$\sum_{n=1}^{\infty} \frac{(-1)^{n-1}(2^{2n})(2^{2n}-1)B_{2n}c^{2n-1}}{(2n)!}$$

where n=1,2,3,4, ..., c=the error value, and $B_{2n}$ is a 2nth Bernoulli number, to substantially evaluate the 3rd PN of terms of the TPS, and to substantially sum the evaluated 3rd PN of terms obtained thereby, obtaining substantially a third sum, the third sum being substantially a third correction value (CV3).

Examples of the 1st PN, the 2nd PN, and the 3rd PN predeterminations for selected bit multiplication factors (BMFs) are set forth in TABLE 1 below, described more particularly following that table, set forth on the next page:

TABLE I

| BMF | 1st PN | 2nd PN | 3rd PN |
|-----|--------|--------|--------|
| 1 | 1 | 0 | 0 |
| 2 | 1 | 1 | 1 |
| 3 | 2 | 1 | 1 |
| 4 | 2 | 2 | 2 |
| 5 | 3 | 2 | 2 |
| 6 | 3 | 3 | 3 |
| 7 | 4 | 3 | 3 |

The 1st PN of terms is substantially a largest first integer less than or equal to a first quotient of {(BMF+1)/2}, where BMF is a bit multiplication factor that is substantially a smallest first integer greater than or equal to a second quotient of a desired number of bits of accuracy in the output trigonometric function value divided by a number of bits of accuracy of a lesser of the first function value and the second function value. The 2nd PN of terms is substantially a largest second integer less than or equal to a third quotient of {BMF/2}, and the 3rd PN of terms is substantially a smallest third integer greater than or equal to a fourth quotient of {(BMF−1)/2}.

Figure 1C:
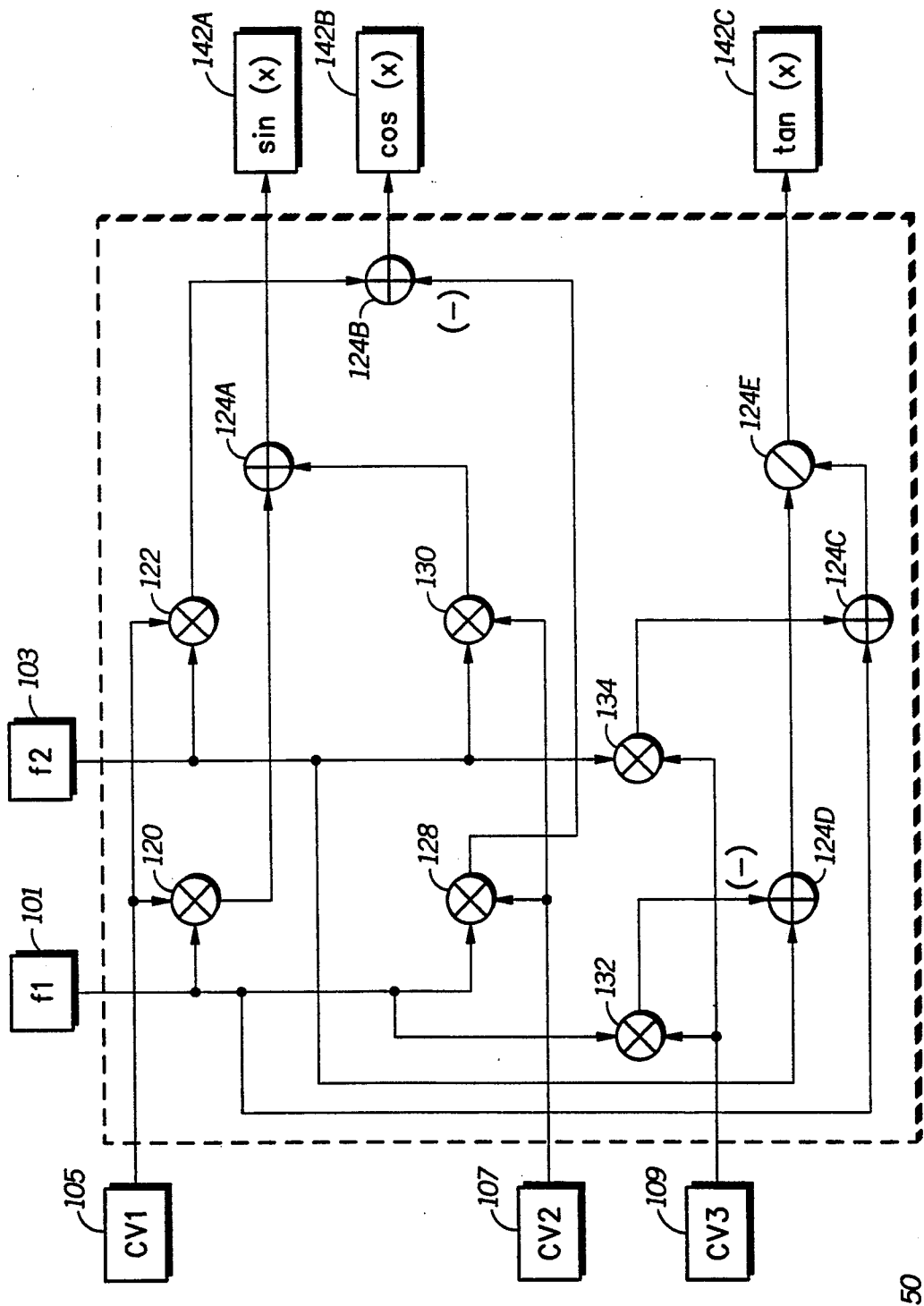
FIG. 1C sets forth one embodiment of a combiner of FIG. 1A.

The combiner (112), one implementation of which is set forth in FIG. 1C, numeral 150, utilizes at least one correction value, the first function value, and the second function value to determine at least one output trigonometric function value, $f(x) \approx OTF$, of the input value x. The combiner (112) typically utilizes at least three of:

a second combiner (120) to substantially determine a first combined output value, substantially being at least a first product of the first correction value and the first function value;

a third combiner (130) to substantially determine a second combined output value, substantially being at least a second product of the second correction value and the second function value;

a fourth combiner (122) to substantially determine a third combined output value, substantially being at least a third product of the first correction value and the second function value;

a fifth combiner (128) to substantially determine a fourth combined output value, substantially being at least a fourth product of the second correction value and the first function value;

a sixth combiner (132) to substantially determine a fifth combined output value, substantially being at least a fifth product of the third correction value and first function value;

a seventh combiner (134) to substantially determine a sixth combined output value, substantially being at least a sixth product of the third correction value and the second function value; and an eighth combiner (124A, 124B, 124C, 124D, 124E) to utilize at least two of: the first combined output value, the second combined output value, the third combined output value, the fourth combined output value, the fifth combined output value, the sixth combined output value, the first function value, and the second function value, substantially determining the at least one output trigonometric function value of the input value.

Figure 2B:
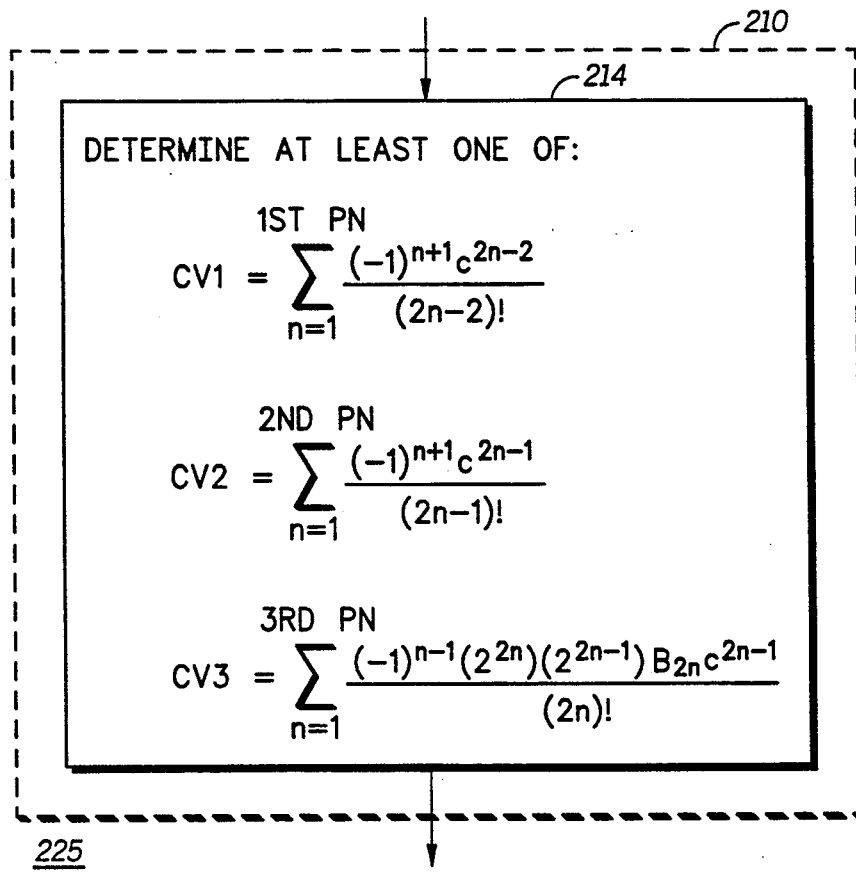
FIG. 2B sets forth one implementation of a step of determining at least one correction value, CV.
Figure 2C:
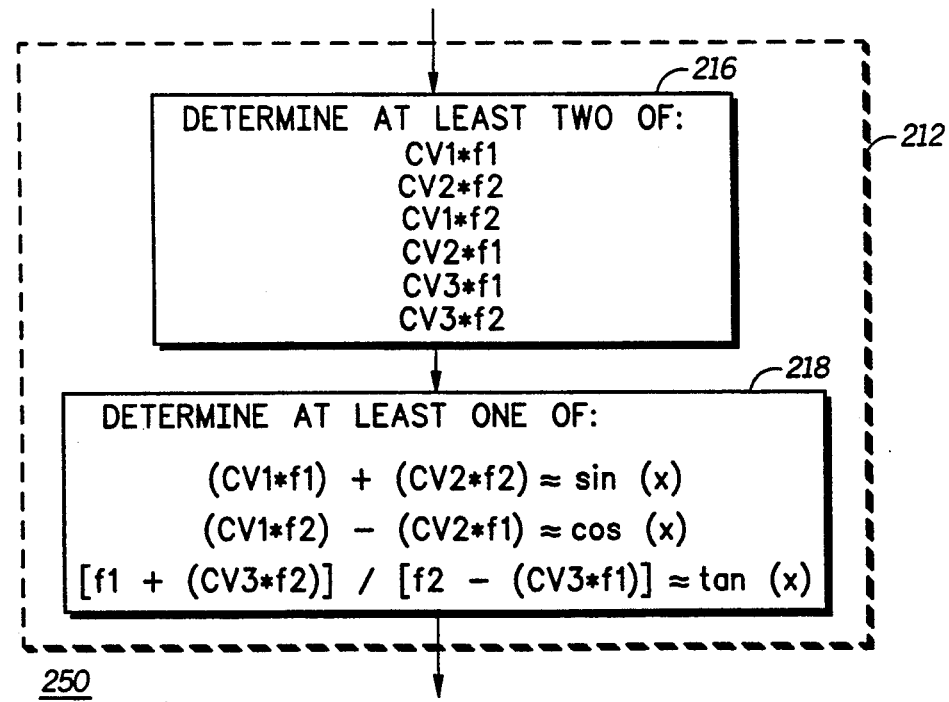
FIG. 2C sets forth one implementation of a step of determining at least one output trigonometric function value, OTF.

The eighth combiner (124A, 124B, 124C, 124D, 124E), as set forth in FIG. 2C, numeral 250, includes at least two of:

a first adder (124A) to substantially determine a fourth sum of the first combined output value and the second combined output value, being substantially a sine value of the input value;

a second subtracter (124B) to determine a second difference of the fourth combined output value subtracted from the third combined output value, being substantially a cosine value of the input value;

a third subtracter (124D) to substantially determine a third difference of the fifth combined output value subtracted from the second function value;

a second adder (124C) to substantially determine a fifth sum of the sixth product and the first function value; and a first divider (124E) to substantially determine a fifth quotient of the fifth sum divided by the third difference, being substantially a tangent value of the input value.

A microprocessor system device can be utilized to implement the above-described invention.

FIG. 2A, generally depicted by the numeral 200, depicts a general flow chart of an implementation of the method of the invention. The best mode of implementing the method of the present invention typically is initiated as follows: a value is input (202), and an approximation value is generated (204), $a \approx \text{mod}(x)$, typically by selecting an approximation value from a predetermined set of values that is generally predetermined by selected rounding algorithms.

An error value, c, is generated (206), typically being substantially a first difference of the input value minus the approximation value, $c \approx x - a$. At least one memory device is typically utilized to substantially determine a first function value f1 (208), generally being a first trigonometric function value of the approximation value, a, and a second function value, f2 (208), generally being a second trigonometric function value of the approximation value, a. The first and second trigonometric function values typically are a sine value, and a cosine value, respectively. It is clear that the first and second trigonometric function values may be be selected in reverse, being a cosine value and a sine value, respectively, with subsequent steps being modified to accommodate that reversal.

Further, at least one correction value (CV) is determined (210). In one embodiment, as set forth in FIG. 2B, numeral 225, the step of determining at least one correction value (214) includes at least one of:

utilizing the error value together with a first predetermined number of terms of a first predetermined mathematical series to substantially evaluate the first predetermined number of terms, and to substantially sum the evaluated first predetermined number of terms obtained thereby, obtaining substantially a first sum, the first sum being substantially a first correction value, CV1;

utilizing the error value together with a second predetermined number of terms of a second predetermined mathematical series to substantially evaluate the second predetermined number of terms, and to substantially sum the evaluated predetermined number of terms obtained thereby, obtaining substantially a second sum, the second sum being substantially a second correction value, CV2; and utilizing the error value together with a third predetermined number of terms of a third predetermined mathematical series to substantially evaluate the third predetermined number of terms, and to substantially sum the evaluated predetermined number of terms obtained thereby, obtaining substantially a third sum, the third sum being substantially a third correction value, CV3.

Typically CV1 (214) is substantially determined by summing a first predetermined number of terms of a first power series of the form:

$$\sum_{n=1}^{\infty} \frac{(-1)^{n+1}c^{2n-2}}{(2n-2)!},$$

where the first number of predetermined number of terms is substantially a largest first integer less than or equal to a first quotient of $\{(BMF+1)/2\}$, where BMF is a bit multiplication factor that is substantially a smallest first integer greater than or equal to a second quotient of a desired number of bits of accuracy in the output trigonometric function value divided by a number of bits of accuracy of a lesser of the first function value and the second function value. Similarly, CV2 (214) is substantially determined by summing a second predetermined number of terms of a second power series of the form:

$$\sum_{n=1}^{\infty} \frac{(-1)^{n+1}c^{2n-1}}{(2n-1)!},$$

where the second number of predetermined number of terms is substantially a largest second integer less than or equal to a third quotient of $\{BMF/2\}$, where BMF is a bit multiplication factor that is substantially the smallest first integer greater than or equal to the second quotient of a desired number of bits of accuracy in the output trigonometric function value divided by a number of bits of accuracy of the lesser of the first function value and the second function value. Similarly, CV3 (214) is substantially determined by summing a third predetermined number of terms of a third power series of the form:

$$\sum_{n=1}^{\infty} \frac{(-1)^{n-1}(2^{2n})(2^{2n}-1)B_{2n}c^{2n-1}}{(2n)!}$$

where $n=1,2,3,4,\ldots$, $c$ = the error value, and $B_{2n}$ is a 2nth Bernoulli number, and where the third predetermined number of terms of substantially a a smallest third integer greater than or equal to a fourth quotient of $\{(BMF-1)/2\}$, where BMF is a bit multiplication factor that is substantially the smallest first integer greater than or equal to the second quotient of a desired number of bits of accuracy in the output trigonometric function value divided by a number of bits of accuracy of the lesser of the first function value and the second function value.

As set forth in FIG. 2C, numeral 250, in one embodiment the at least one output trigonometric function value (OTF), of the input value is determined (212) by at least three of the following steps:

substantially determining a first combined output value, substantially being at least a first product of the first correction value and the first function value (216);

substantially determining a second combined output value, substantially being at least a second product of the second correction value and the second function value (216);

substantially determining a third combined output value, substantially being at least a third product of the first correction value and the second function value (216);

substantially determining a fourth combined output value, substantially being at least a fourth product of the second correction value and the first function value (216);

substantially determining a fifth combined output value, substantially being at least a fifth product of the third correction value and the first function value (216);

substantially determining a sixth combined output value, substantially being at least a sixth product of sthe third correction value and the second function value (216); and utilizing at least two of: the first combined output value, the second combined output value, the third combined output value, the fourth combined output value, the fifth combined output value, the sixth combined output value, the first function value, and the second function value to substantially determine the at least one output trigonometric function value of the input value, where utilizing at least two of the values in the last listed above step substantially includes at least two of:

substantially determining a fourth sum of the first combined output value and the second combined output value (218);

substantially determining a second difference of the fourth combined output value subtracted from the third combined output value (218);

substantially determining a third difference of the fifth combined output value subtracted from the second function value (218);

substantially determining a fifth sum of the sixth product and the first function value (218); and substantially determining a fifth quotient of the fifth sum divided by the third difference (218).

The fourth sum is substantially a first at least one output trigonometric function value of the input value, being substantially a sine value (218) of the input value.

The second difference is substantially a second at least one output trigonometric function value of the input value, being substantially a cosine value (218) of the input value.

The fifth quotient is substantially a third at least one output trigonometric function value of the input value, being substantially a tangent value (218) of the input value.

Clearly, the cosecant, secant, and cotangent are readily determined with the present invention, one such implementation being obtaining reciprocals of the sine, cosine, and tangent values. Another implementation would utilize power series appropriate to the cosecant, secant, and cotangent for the determination of the error value.

I claim:

1. A device for processing an input value to provide at least one output trigonometric function value, comprising:
   A) modification means responsive to the input value for generating an approximation value, the approximation value having a number of bits less than or equal to a number of bits of precision of the input value;
   B) error generator means responsive to the input value and the modification means for generating an error value;
   C) at least one first memory device, a first ROM, responsive to the modification means, for generating a first trigonometric function value;
   D) function generator means responsive to the modification means for generating a second function value;
   E) correction evaluator means responsive to the error generator means for determining at least one correction value;
   G) first combining means responsive to the correction evaluator means, at least the first ROM, and the function generator means for determining the at least one output trigonometric function value of the input value.

2. The device of claim 1, wherein the approximation value is selected from a predetermined set of values.

3. The device of claim 2, wherein the predetermined set of values is a group of values predetermined by selected rounding algorithms.

4. The device of claim 1, wherein the error generator means includes at least first subtraction means for determining a first difference of the input value minus the approximation value, the first difference being the error value.

5. The device of claim 1, wherein the first trigonometric function value is a sine value of the approximation value.

6. The device of claim 1, wherein the function generator means utilizes the at least one second memory device to determine a second trigonometric function value.

7. The device of claim 6, wherein the at least one second memory device is a second ROM.

8. The device of claim 6, wherein the second trigonometric function value is a cosine value of the approximation value.

9. The device of claim 1, wherein the correction evaluator means responsive to the error generator means further includes at least one of:
   A) first determining means, responsive to the error generator means for utilizing the error value together with a first predetermined number of terms of a first predetermined mathematical series to evaluate the first predetermined number of terms, and to sum the evaluated first predetermined number of terms obtained thereby, obtaining a first sum, the first sum being a first correction value;
   B) second determining means, responsive to the error generator means for utilizing the error value together with a second predetermined number of terms of a second predetermined mathematical series to evaluate the second predetermined number of terms, and to sum the evaluated second predetermined number of terms obtained thereby, obtaining a second sum, the second sum being a second correction value; and
   C) third determining means, responsive to the error generator means for utilizing the error value together with a third predetermined number of terms of a third predetermined mathematical series to evaluate the third predetermined number of terms, and to sum the evaluated predetermined number of terms obtained thereby, obtaining a third sum, the third sum being a third correction value.

10. The device of claim 9, wherein the first predetermined number of terms is a largest first integer less than or equal to a first quotient of $\{(BMF+1)/2\}$, where BMF is a bit multiplication factor that is a smallest first integer greater than or equal to a second quotient of a desired number of bits of accuracy in the output trigonometric function value divided by a number of bits of accuracy of a lesser of the first function value and the second function value.

11. The device of claim 9, wherein the first predetermined mathematical series is a first power series.

12. The device of claim 11, wherein the first power series is a first series of a form:

$$\sum_{n=1}^{\infty} \frac{(-1)^{n+1} c^{2n-2}}{(2n-2)!}$$

where $n = 1, 2, 3, 4, \ldots$ and $c =$ the error value.

13. The device of claim 9, wherein the second predetermined number of terms is a largest second integer less than or equal to a third quotient of $\{BMF/2\}$, where BMF is a bit multiplication factor that is the smallest first integer greater than or equal to the second quotient of a desired number of bits of accuracy in the output trigonometric function value divided by a number of bits of accuracy of the lesser of the first function value and the second function value.

14. The device of claim 9, wherein the second predetermined mathematical series is a second power series.

15. The device of claim 14, wherein the second power series is a second series of a form:

$$\sum_{n=1}^{\infty} \frac{(-1)^{n+1} c^{2n-1}}{(2n-1)!}$$

where $n = 1, 2, 3, 4, \ldots$ and $c =$ the error value.

16. The device of claim 9, wherein the third predetermined number of terms is a smallest third integer greater than or equal to a fourth quotient of $\{(BMF-1)/2\}$, where BMF is a bit multiplication factor that is the smallest first integer greater than or equal to the second quotient of a desired number of bits of accuracy in the output trigonometric function value divided by a number of bits of accuracy of the lesser of the first function value and the second function value.

17. The device of claim 9, wherein the third predetermined mathematical series is a third power series.

18. The device of claim 17, wherein the third power series is a third series of a form:

$$\sum_{n=1}^{\infty} \frac{(-1)^{n-1}(2^{2n})(2^{2n}-1)B_{2n}c^{2n-1}}{(2n)!}$$

where $n=1,2,3,4,\ldots$, $c=$ the error value, and $B_{2n}$ is a 2nth Bernoulli number.

19. The device of claim 1, wherein the first combining means includes at least three of:
   A) second combining means responsive to the correction evaluator means and at least the one first memory device, a first ROM for determining a first combined output value, being at least a first product of the first correction value and the first function value;
   B) third combining means responsive to the correction evaluator means and the function generator means for determining a second combined output value, being at least a second product of the second correction value and the second function value;
   C) fourth combining means responsive to the function generator means and the correction evaluator means for determining a third combined output value, being at least a third product of the first correction value and the second function value;
   D) fifth combining means responsive to at least the one first memory device, the first ROM and the correction evaluator means for determining a fourth combined output value, being at least a fourth product of the second correction value and the first function value;
   E) sixth combining means responsive to at least the one first memory device, the first ROM and the correction evaluator means for determining a fifth combined output value, being at least a fifth product of the third correction value and the first function value;
   F) seventh combining means responsive to the function generator means and the correction evaluator means for determining a sixth combined output value, being at least a sixth product of the third correction value and the second function value; and
   G) eighth combining means responsive to at least two of: the second combining means, the third combining means, the fourth combining means, the fifth combining means, the sixth combining means, seventh combining means, at least the one first memory device, the first ROM, and the function generator means for determining the at least one output trigonometric function value of the input value.

20. The device of claim 19, wherein the second combining means further includes at least a multiplication means for determining a first product of the first correction value and the first function value.

21. The device of claim 19, wherein the third combining means includes at least a second multiplication means for determining a second product of the second correction value and the second function value.

22. The device of claim 19, wherein the fourth combining means includes at least a third multiplication means for determining a third product of the first correction value and the second function value.

23. The device of claim 19, wherein the fifth combining means includes at least a fourth multiplication means for determining a fourth product of the second correction value and the first function value.

24. The device of claim 19, wherein the sixth combining means further includes at least a seventh multiplication means for determining a seventh product of the third correction value and the first function value.

25. The device of claim 19, wherein the seventh combining means further includes at least an eighth multiplication means for determining a eighth product of the third correction value and the second function value.

26. The device of claim 19, wherein the eighth combining means includes at least two of:
   A) first addition means responsive to the second combining means and the third combining means for determining a fourth sum of the first combined output value and the second combined output value;
   B) second subtraction means responsive to the fourth combining means and the fifth combining means for determining a second difference of the fourth combined output value subtracted from the third combined output value;
   C) third subtraction means responsive to the sixth combining means and the function generator means for determining a third difference of the fifth combined output value subtracted from the second function value;
   D) second addition means responsive to the seventh combining means and at least the one first memory device, the first ROM for determining a fifth sum of the sixth product and the first function value; and
   E) first division means responsive to the third subtraction means and the second addition means for determining a fifth quotient of the fifth sum divided by the third difference.

27. The device of claim 26, wherein the fourth sum is a first at least one output trigonometric function value of the input value, being a sine of the input value.

28. The device of claim 26, wherein the second difference is a second at least one output trigonometric function value of the input value, being a cosine of the input value.

29. The device of claim 26, wherein the fifth quotient is a third at least one output trigonometric function value of the input value, being a tangent of the input value.

30. A device for carrying out a prescribed digital signal processing operation on at least one input signal, a respective value of which is provided in digitally encoded format as a first at least one bit digital signal code, to provide at least one desired function value of the respective value of the at least one input signal in a digitally encoded format as a second at least one bit digital signal code, comprising:
   first means, coupled to receive said first at least one bit digital signal code, for generating an approximation value, the approximation value having a number of bits less than or equal to a number of bits of precision of the input value, in a digitally encoded format as a third at least one bit digital signal code and providing the approximation value over respective bit lines of a multibit approximation output link;
   second means, coupled to the multibit approximation output link lines of said first means and coupled to receive the first at least one bit digital signal code, for generating an error value in a digitally encoded format as a fourth at least one bit digital signal code and providing the error value over multibit error output link lines;

at least one first memory device, a first ROM, coupled to the multibit error output link lines, for determining at least a first trigonometric function output value in a digitally encoded format as a fifth at least one bit digital signal code and providing the first trigonometric function output value over multibit first function value output link lines;

third means, coupled to the multibit error output link lines, for determining at least a second function output value in a digitally encoded format as a sixth at least one bit digital signal code and providing the second function output value over multibit second function value output link lines;

fourth means, coupled to the multibit error output link lines, for generating at least one correction output value in a digitally encoded format as at least a seventh at least one bit digital signal code and providing the at least one correction output value over multibit correction output value link lines;

fifth means, coupled to the multibit first function value output link lines, the multibit correction output link lines, and the multibit second function value output link lines for obtaining at least one combined output value in a digitally encoded format as a eighth at least one bit digital signal code and providing the at least one combined output value over multibit combined output value link lines such that the at least one combined output value represents at least one desired function value of the respective value of the at least one input signal in a digitally encoded format.

31. The device of claim 30, wherein the approximation value is selected from a predetermined set of values.

32. The device of claim 31, wherein the predetermined set of values is a group of values predetermined by selected rounding algorithms.

33. The device of claim 30, wherein the second means includes at least first subtraction means for determining a first difference of the respective value of the at least one input signal minus the approximation value, the first difference being the error value.

34. The device of claim 30, wherein the first trigonometric function value is a sine value of the approximation value.

35. The device of claim 30, wherein the third means utilizes at least one second memory device to determine a second trigonometric function value.

36. The device of claim 35, wherein the at least one second memory device is a second ROM.

37. The device of claim 35, wherein the second trigonometric function value is a cosine value of the approximation value.

38. The device of claim 30, wherein the fourth means further includes at least one of:

A) first determining means, responsive to the second means, for utilizing the error value together with a first predetermined number of terms of a first predetermined mathematical series to evaluate the first predetermined number of terms, and to sum the evaluated first predetermined number of terms obtained thereby, obtaining a first sum, the first sum being a first correction value;

B) second determining means, responsive to the second means, for utilizing the error value together with a second predetermined number of terms of a second predetermined mathematical series to evaluate the second predetermined number of terms, and to sum the evaluated second predetermined number of terms obtained thereby, obtaining a second sum, the second sum being a second correction value; and C) third determining means, responsive to at least the one first memory device, the first ROM, for utilizing the error value together with a third predetermined number of terms of a third predetermined mathematical series to evaluate the third predetermined number of terms, and to sum the evaluated third predetermined number of terms obtained thereby, obtaining a third sum, the third sum being a third correction value.

39. The device of claim 38, wherein the first predetermined number of terms is a largest first integer less than or equal to a first quotient of $\{(BMF+1)/2\}$, where BMF is a bit multiplication factor that is a smallest first integer greater than or equal to a second quotient of a desired number of bits of accuracy in the output trigonometric function value divided by a number of bits of accuracy of a lesser of the first function value and the second function value.

40. The device of claim 38, wherein the first predetermined mathematical series is a first power series.

41. The device of claim 40, wherein the first power series is a first series of a form:

$$\sum_{n=1}^{\infty} \frac{(-1)^{n+1} c^{2n-2}}{(2n-2)!}$$

where n = 1,2,3,4, ... and c = the error value.

42. The device of claim 41, wherein the second power series if a second series of a form:

$$\sum_{n=1}^{\infty} \frac{(-1)^{n+1} c^{2n-1}}{(2n-1)!}$$

where n = 1,2,3,4, ... and c = the error value.

43. The device of claim 38, wherein the second predetermined number of terms is a largest second integer less than or equal to a third quotient of $\{BMF/2\}$, where BMF is a bit multiplication factor that is the smallest first integer greater than or equal to a second quotient of a desired number of bits of accuracy in the output trigonometric function value divided by a number of bits of accuracy of the lesser of the first function value and the second function value.

44. The device of claim 38, wherein the second predetermined mathematical series is a second power series.

45. The device of claim 38, wherein the third predetermined number of terms is a smallest third integer greater than or equal to a fourth quotient of $\{(BMF-1)/2\}$, where BMF is a bit multiplication factor that is the smallest first integer greater than or equal to the second quotient of a desired number of bits of accuracy in the output trigonometric function value divided by a number of bits of accuracy of the lesser of the first function value and the second function value.

46. The device of claim 38, wherein the third predetermined mathematical series is a third power series.

47. The device of claim 46, wherein the third power series is a third series of a form:

$$\sum_{n=1}^{\infty} \frac{(-1)^{n-1}(2^{2n})(2^{2n} - 1)B_{2n}c^{2n-1}}{(2n)!}$$

where $n=1,2,3,4,\ldots$, $c=$ the error value, and $B_{2n}$ is a 2nth Bernoulli number.

48. The device of claim 30, wherein the fifth means includes at least three of:
A) first combining means responsive to the fourth means and at least the one first memory device, a first ROM, for determining a first combined output value.
B) second combining means responsive to the fifth means and the third means for determining a second combined output value;
C) third combining means responsive to the third means and the fourth means for determining a third combined output value;
D) fourth combining means responsive to at least the one first memory device, the first ROM, and the fifth means for determining a fourth combined output value;
E) fifth combining means responsive to the at least the one first memory device, the first ROM, and the fourth means for determining a fifth combined output value;
F) sixth combining means responsive to the third means and the fourth means for determining a sixth combined output value;
G) seventh combining means responsive to at least two of: at least the one first memory device, the first ROM, the third means, the first combining means, the second combining means, the third combining means, the fourth combining means, the fifth combining means, and the sixth combining means for obtaining at least one combined output value in a digitally encoded format as an eight at least one bit digital signal code and providing the at least one combined output value over multibit combined output value link lines such that the at least one combined output value represents at least one desired function value of the respective value of the at least one input signal in a digitally encoded format.

49. The device of claim 48, wherein the first combining means includes at least a first multiplication means for determining a first product of the first correction value and the first function value.

50. The device of claim 48, wherein the second combining means includes at least a second multiplication means for determining a second product of the second correction value and the second function value.

51. The device of claim 48, wherein the third combining means includes at least a third multiplication means for determining a third product of the first correction value and the second function value.

52. The device of claim 48, wherein the fourth combining means includes at least a fourth multiplication means for determining a fourth product of the second correction value and the first function value.

53. The device of claim 48, wherein the fifth combining means includes at least a fifth multiplication means for determining a fifth product of the third correction value and the first function value.

54. The device of claim 48, wherein the sixth combining means includes at least a sixth multiplication means for determining a sixth product of the third correction value and the second function value.

55. The device of claim 48, wherein the seventh combining means includes at least two of:
A) first addition means responsive to the first combining means and the second combining means for determining a fourth sum of the first combined output value and the second combined output value;
B) second subtraction means responsive to the third combining means and the fourth combining means for determining a second difference of the fourth combined output value subtracted from the third combined output value;
C) third subtraction means responsive to the fifth combining means and the third means for determining a third difference of the sixth combined output value subtracted from the first function value;
D) second addition means responsive to the sixth combining means and at least the one first memory device, the first ROM, for determining a fifth sum of the fifth combined output value and the second function value;
E) first division means responsive to the third subtraction means and the second addition means for determining a fifth quotient of the fifth sum and the third difference.

56. The device of claim 55, wherein the fourth sum is a third trigonometric function value, being a sine function value of the respective value of the at least one input signal.

57. The device of claim 55, wherein the second difference is a fourth trigonometric function value, being a cosine function value of the respective value of the at least one input signal.

58. The device of claim 55, wherein the fifth quotient is a fifth trigonometric function value, being a tangent function value of the respective value of the at least one input signal.

59. A microprocessing device for processing an input value, x, to provide at least one desired output trigonometric function value having a desired degrees of accuracy, comprising:
A) modification means responsive to the input value, x, for generating an approximation value, a, the approximation value having a number of bits less than or equal to a number of bits of precision of the input value;
B) error generator means responsive to the input value and the modification means for generating an error value;
C) at least one first memory device, a first ROM, having the same degree of precision as the accuracy of the at least one desired output trigonometric function value for generating a first function value, f1;
D) function generator means responsive to the modification means for generating a second function value, f2;
E) correction evaluator means responsive to the error generator means for determining at least one correction value; and
F) first combining means responsive to the correction evaluator means, at least the one first memory device, the first ROM, and the function generator means for determining at least one desired output trigonometric function value of the input value x and having the desired degree of accuracy.

60. The device of claim 59, wherein a, the approximation value, is selected from a predetermined set of values.

61. The device of claim 60, wherein the predetermined set of values is a group of values predetermined by selected rounding algorithms.

62. The device of claim 59, wherein the error generator means includes at least first subtraction means for determining a first difference of the input value minus the approximation value, the first difference being the error value, c, such that $c = x - a$.

63. The device of claim 59, wherein the first trigonometric function value is a sine value of the approximation value, sin a.

64. The device of claim 59, wherein the function generator means utilizes an at least one second memory device to determine a second trigonometric function value.

65. The device of claim 64, wherein the at least one second memory device is a second ROM having the same degree of precision as the accuracy of the at least one desired output trigonometric function value.

66. The device of claim 64, wherein the second trigonometric function value is a cosine value of the approximation value, cos a.

67. The device of claim 59, wherein the correction evacuator means responsive to the error generator means further includes at least one of:

A) first determining means, responsive to the error generator means for utilizing the error value together with a first predetermined number of terms of a first predetermined mathematical series to evaluate the first predetermined number of terms, and to sum the evaluated first predetermined number of terms obtained thereby, obtaining a first sum, the first sum being a first correction value;

B) second determining means, responsive to the error generator means for utilizing the error value together with a second predetermined number of terms of a second predetermined mathematical series to evaluate the second predetermined number of terms, and to sum the evaluated predetermined number of terms obtained thereby, obtaining a second sum, the second sum being a second correction value; and C) third determining means, responsive to the error generator means for utilizing the error value together with a third predetermined number of terms of a third predetermined mathematical series to evaluate the third predetermined number of terms, and to sum the evaluated predetermined number of terms obtained thereby, obtaining a third sum, the third sum being a third correction value;

68. The device of claim 67, wherein the first predetermined number of terms is a largest first integer less than or equal to a first quotient of $\{(BMF+1)/2\}$, where BMF is a bit multiplication factor that is a smallest first integer greater than or equal to a second quotient of a desired number of bits of accuracy in the output trigonometric function value divided by a number of bits of accuracy of a lesser of the first function value and the second function value.

69. The device of claim 67, wherein the first predetermined mathematical series is a first power series.

70. The device of claim 69, wherein the first power series is a first series of a form:

$$\sum_{n=1}^{\infty} \frac{(-1)^{n+1} c^{2n-2}}{(2n-2)!}$$

where $n = 1, 2, 3, 4, \ldots$ and $c =$ the error value.

71. The device of claim 67, wherein the second predetermined number of terms is a largest second integer less than or equal to a third quotient of $\{BMF/2\}$, where BMF is a bit multiplication factor that is the smallest first integer greater than or equal to the second quotient of a desired number of bits of accuracy in the output trigonometric function value divided by a number of bits of accuracy of the lesser of the first function value and the second function value.

72. The device of claim 67, wherein the second predetermined mathematical series is a second power series.

73. The device of claim 72, wherein the second power series is a second series of a form:

$$\sum_{n=1}^{\infty} \frac{(-1)^{n+1} c^{2n-1}}{(2n-1)!}$$

where $n = 1, 2, 3, 4, \ldots$ and $c =$ the error value.

74. The device of claim 67, wherein the third predetermined number of terms is a smallest third integer greater than or equal to a fourth quotient $\{(BMF-1)/2\}$, where BMF is a bit multiplication factor that is the smallest first integer greater than or equal to the second quotient of a desired number of bits of accuracy in the output trigonometric function value divided by a number of bits of accuracy of the lesser of the first function value and the second function value.

75. The device of claim 67, wherein the third predetermined mathematical series is a third power series.

76. The device of claim 75, wherein the third power series is a third series of a form:

$$\sum_{n=1}^{\infty} \frac{(-1)^{n-1}(2^{2n})(2^{2n}-1)B_{2n} c^{2n-1}}{(2n)!}$$

where $n = 1, 2, 3, 4, \ldots$, $c =$ the error value, and $B_{2n}$ is a 2nth Bernoulli number.

77. The device of claim 59, wherein the first combining means includes at least three of:

A) second combining means responsive to the correction evaluator means and at least the one first memory device, the first ROM for determining a first combined output value, being at least a first product of the first correction value and the first function value;

B) third combining means responsive to the correction evaluator means and the function generator means for determining a second combined output value, being at least a second product of the second correction value and the second function value;

C) fourth combining means responsive to the function generator means and the correction evaluator means for determining a third combined output value, being at least a third product of the first correction value and the second function value;

D) fifth combining means responsive to the at least the one first memory device, the first ROM and the correction evaluator means for determining a fourth combined output value, being at least a fourth product of the second correction value and the first function value;

E) sixth combining means responsive to the at least the one first memory device, the first ROM and the correction evaluator means for determining a fifth combined output value, being at least a fifth product of the third correction value and the first function value; p1 F) seventh combining means responsive to the function generator means and the correction evaluator means for determining a sixth combined output value, being at least a sixth product of the third correction value and the second function value; and G) eighth combining means responsive to at least two of: the second combining means, the third combining means, the fourth combining means, the fifth combining means, the sixth combining means, seventh combining means, at least the one first memory device, the first ROM, and the function generator means for determining the at least one output trigonometric function value of the input value.

78. The device of claim 77, wherein the second combining means further includes at least a multiplication means for determining a first product of the first correction value and the first function value.

79. The device of claim 77, wherein the third combining means includes at least a second multiplication means for determining a second product of the second correction value and the second function value.

80. The device of claim 77, wherein the fourth combining means includes at least a third multiplication means for determining a third product of the first correction value and the second function value.

81. The device of claim 77, wherein the fifth combining means includes at least a fourth multiplication means for determining a fourth product of the second correction value and the first function value.

82. The device of claim 77, wherein the sixth combining means includes at least a seventh multiplication means for determining a seventh product of the third correction value and the first function value.

83. The device of claim 77, wherein the seventh combining means further includes at least an eighth multiplication means for determining an eighth product of the third correction value and the second function value.

84. The device of claim 77, wherein the eighth combining means includes at least two of:

A) first addition means responsive to the second combining means and the third combining means for determining a fourth sum of the first combined output value and the second combined output value;

B) second subtraction means responsive to the fourth combining means and the fifth combining means for determining a second difference of the fourth combined output value subtracted from the third combined output value;

C) third subtraction means responsive to the sixth combining means and the function generator means for determining a third difference of the fifth combined output value subtracted from the second function value D) second addition means responsive to the seventh combining means and at least the one first memory device, the first ROM for determining a fifth sum of the sixth product and the first function value; and E) first division means responsive to the third subtraction means and the second addition means for determining a fifth quotient of the fifth sum divided by the third difference.

85. The device of claim 84, wherein the fourth sum is a first at least one output trigonometric function value of the input value, being a sine of the input value.

86. The device of claim 84, wherein the second difference is a second at least one output trigonometric function value of the input value, being a cosine of the input value.

87. The device of claim 84, wherein the fifth quotient is a third at least one output trigonometric function value of the input value, being a tangent of the input value.

* * * * *

UNITED STATES PATENT AND TRADEMARK OFFICE
CERTIFICATE OF CORRECTION

PATENT NO. : 5,222,036

DATED : June 22, 1993

INVENTOR(S) : Brett L. Lindsley

It is certified that error appears in the above-identified patent and that said Letters Patent is hereby corrected as shown below:

At column 13, line 24, "to the at least" should be --to at least--.

At column 15, line 27, "evacuator" should be --evaluator--.

At column 17, line 1, "to the at least" should be --to at least--.

At column 17, line 6, delete "p1".

Signed and Sealed this

Fifteenth Day of March, 1994

Attest:

BRUCE LEHMAN

Attesting Officer     Commissioner of Patents and Trademarks